United States Patent [19]

Stenger et al.

[11] Patent Number: 4,784,186

[45] Date of Patent: Nov. 15, 1988

[54] NON-REINFORCED FILM OF CELLULOSE

[75] Inventors: Karl Stenger, Ruedesheim; Horst Faust, Wiesbaden, both of Fed. Rep. of Germany

[73] Assignee: Hoechst Aktiengesellschaft, Frankfurt am Main, Fed. Rep. of Germany

[21] Appl. No.: 96,491

[22] Filed: Sep. 15, 1987

[30] Foreign Application Priority Data

Sep. 18, 1986 [DE] Fed. Rep. of Germany ....... 3631669

[51] Int. Cl.$^4$ .............................................. A22C 13/00
[52] U.S. Cl. .................................... 138/118.1; 536/57
[58] Field of Search ........................ 138/118.1; 536/57

[56] References Cited

U.S. PATENT DOCUMENTS

| | | | |
|---|---|---|---|
| 2,607,696 | 8/1952 | Kunz | 99/171 |
| 2,653,432 | 9/1953 | Wright et al. | 53/61 |
| 2,686,725 | 8/1954 | Cornwell | 99/176 |
| 2,698,967 | 1/1955 | Reichel et al. | 264/197 |
| 4,233,341 | 11/1980 | Hammer et al. | 427/230 |
| 4,399,839 | 8/1983 | Hutschenreuter et al. | 138/118.1 |
| 4,401,135 | 8/1983 | Andrae et al. | 138/118.1 |
| 4,401,136 | 8/1983 | Porrmann et al. | 138/118.1 |
| 4,478,670 | 10/1984 | Heyse et al. | 156/380.1 |
| 4,528,225 | 7/1985 | Hutschenreuter et al. | 428/36 |
| 4,556,708 | 12/1985 | Andrae et al. | 536/57 |
| 4,560,520 | 12/1985 | Erk et al. | 138/118.1 X |
| 4,563,231 | 1/1986 | Oirrnabb et al. | 156/90 |

Primary Examiner—Mark J. Thronson
Attorney, Agent, or Firm—Foley & Lardner, Schwartz, Jeffery, Schwaab, Mack, Blumenthal & Evans

[57] ABSTRACT

An improved non-reinforced cellulose film is disclosed. The film is useful as a sausage casing. When exposed to water the casing shrinks in the transverse or circumferential direction, so that the sausages look plump and crease-free and the casing can be peeled easily from the enclosed sausage meat. The film is made by moistening a non-reinforced cellulose film, drawing the film in the transverse direction, and drying the film in the stretched state.

19 Claims, No Drawings

NON-REINFORCED FILM OF CELLULOSE

BACKGROUND OF THE INVENTION

The invention relates to a non-reinforced film of regenerated cellulose, which is suitable for the production of tubular sausage casings having a seam in the direction of their longitudinal axes. The invention also relates to a process for producing the non-reinforced film of regenerated cellulose and to a sausage casing made of a film according to the invention.

The production of web-shaped cellulose films intended for use as support materials for tubular sausage casings is, for example, described in European Pat. No. 54 162. Film production, tube forming and the finished sausage are shown in the drawings accompanying the patent. However, the films described in that publication are fiber-reinforced and their mechanical properties can therefore not be compared with those of non-reinforced films of cellulose, so-called cellophane films.

Processes have also been described, in which the sausage emulsion is pressed into a tubing which is formed directly at the stuffing horn (U.S. Pat. Nos. 2,607,696, 2,653,432 and 2,686,725). For use in these processes, regenerated cellulose has also been mentioned as a suitable film material.

Furthermore, U.S. Pat. No. 2,698,967 discloses a process for the production of cellulose films, in which a finished cellulose film which has been produced according to the viscose process is humidified to a moisture content of 12 to 15% by weight and then post-stretched 4% to 7% in the transverse direction. This post-stretching in the transverse direction is, however, only intended to compensate for the transverse shrinkage which occurred in the preceding drying process. The reference also states that dried cellulose films usually swell when they are remoistened with water and thereby extend 30% in the transverse direction and shrink 10% in the longitudinal direction. The post-stretched films, on the other hand, are said to exhibit more uniform properties in the transverse and longitudinal directions.

This swelling behavior of the cellulose casings gives rise to serious disadvantages when the casings are used as tubular sausage casings, because upon filling with sausage meat and in the following scalding process the cellulose film absorbs water and expands in the circumferential direction. Consequently, the sausage casing looks flabby and wrinkled and it is difficult to peel it from the sausage.

SUMMARY OF THE INVENTION

It is therefore an object of the present invention to improve the non-reinforced films of cellulose used in the production of tubular sausage casings.

It is another object of the invention to improve tubular sausage casings in such a way that the sausages obtained look plump and crease-free and that the sausage casings can be peeled from the enclosed sausage meat without difficulty, in particular in high-speed peelers.

It is a further object of the present invention to improve the process for making non-reinforced films of regenerated cellulose.

These and other objects are achieved by moistening a non-reinforced cellulose film, drawing the film in the transverse direction, and drying the film in the stretched state. The post-stretched film has a weight per unit area of about 20 to 50 $g/m^2$, preferably about 30 to 40 $g/m^2$, and more preferably about 32 to 37 $g/m^2$ and a moisture content of about 6% to 15% by weight. When the post stretched film is saturated with water, it displays an elongation in the longitudinal direction of about 0.5% to 1.5% and a shrinkage in the transverse direction of about 3% to 8%, in particular of about 4% to 7%.

DETAILED DESCRIPTION OF THE PREFERRED EMBODIMENTS

The film of regenerated cellulose according to the invention does not contain a fiber-reinforcement and is thus basically only composed of cellophane, water and plasticizer. It usually has a moisture content of about 6% to 15% by weight, particularly of 7% to 12% by weight, which is customary in this material and ensues when the film is stored at usual temperatures (15° to 30° C.) and at the normal atmospheric humiditiy of about 40% to 70%. Also the content of plasticizer which appropriately comprises a polyol, for example glycerol, is in the range conventionally used in sausage casings of cellulose, namely from about 16% to 20% by weight. The proportions indicated in each case relate to the total weight of the film.

The film is produced according to the viscose process in which an alkaline solution of sodium cellulose xanthogenate, usually referred to as the viscose solution, is pressed in the shape of a web through a slot die and is caused to coagulate with an acidic coagulation liquid based on sulfuric acid. In further process steps, the web-shaped product which initially is predominantly composed of viscose gel is converted into cellulose hydrate gel by means of regenerating baths of dilute sulfuric acid. The web is then passed through washing baths to remove any acid and salts, optionally also through desulfurizing and/or bleaching baths and finally through a plasticizer bath. The web which is composed of cellulose hydrate gel, plasticizer and still predominantly water is converted into regenerated cellulose by an intensive drying procedure at 80° to 140° C. and is adjusted to the desired water content which appropriately ranges from 8% to 12% by weight, relative to the total weight.

It is only in the following process steps that the film develops the properties which are essential in the present invention. In the process, the film which has been completed according to the viscose process is again heavily moistened and then drawn in the transverse direction using appropriate gripping devices which seize the film at the two web edges. The film is then dried in the stretched state, and the moist web is thus prevented from shrinking in the course of the drying procedure.

Suitable gripping devices are, for example, needle rolls, needle belts, needle chains, tenter chains and a cord-shaped guiding device, which are known per se for use as transverse stretching devices in the production of films. By means of these devices the film is stretched in the transverse direction and simultaneously conveyed in web direction through further treatment stations.

Moistening of the film does not include its edge zones which must rather remain dry over a width of about 3 to 7 cm. Due to the higher strength of the dry material there is then no risk of the material tearing at the gripping elements as a result of the tensile forces occurring during stretching.

Depending on the strength of the film and the degree of transverse stretching, a reinforcement is additionally provided in the edge zones. Reinforcement is effected, for example, by applying an adhesive tape or by folding the edge and fixing the fold by inserting a double-side adhesive tape or by introducing an adhesive.

A hydrophobic agent or varnish is preferably applied to the edge zones of the film to keep them dry. Suitable hydrophobic agents include, for example, the fluorine-based impregnating agents, such as fluorocarbon polymers or fluoroalkyl-chromium-III-complex solutions, which are marketed under the trademark of Scotchgard ® (manufacturers 3M Company) or polymers based on organosilicon compounds.

Water is preferably applied to the film from both sides using customary equipment, for example, a spray apparatus, a wire bar or rollers, or the film is passed through a water bath. It is also possible to humidify the two sides of the film with different aqueous solutions or emulsions, for example, the film surface which later forms the interior surface of the sausage casing produced from the film is moistened with a preparation improving the peelability of the film.

As soon as the desired degree of humidity, which is above 80% by weight, particularly at least 100% by weight, has been reached, the film is gradually stretched in the transverse direction up to the intended final value, while being continuously moved forward. The film is generally stretched at the maximum moisture content which usually ranges from 140% to 170%, according to the swelling value of the cellulose film.

When the maximum transverse expansion which is in the range from 18% to 35% has been attained, the film is dried under mild conditions while keeping up the tension.

In the process care has to be taken that the film is as far as possible crease-free and does not have any excess water on its surface. During the action of heat, slight shrinking is optionally allowed to take place such that a reduced transverse expansion of 15% to 25% results. Upon reaching a residual humidity of not more than 20%, preferably of approximately 12% or less, the transverse tension force is released and the unstretched edge zones which have remained dry are cut off. The film is then either wound up or used directly for processing into tubular casings. Tube forming is effected in the customary manner as described, for example, in European Pat. Nos. 37 543, 54 162, 76 436, 80 120 and European Pat. No. 101 892.

To determine the dimensional change of the film upon absorption of water, a film sample of $10 \times 10$ cm is placed in warm water of about 30° to 40° C. for 30 minutes. It is then completely saturated with water, i.e., the water content of the film then corresponds to its swelling value which usually is in the range from about 140% to 170% in non-reinforced cellulose films. In the present case, the film has a reduced swelling value ranging from about 125% to 140%, due to post-stretching in the transverse direction.

The swelling value is thus the maximum water absorbing capacity of the film and indicates the maximum water content of the film, relative to its total weight. The swelling value is determined according to a method as described in German Auslegeschrift No. 2,512,994 (column 8).

The terms "longitudinal direction" and "increase in length" as used in the description of the film, relate to machine direction; the terms "transverse direction", "transverse shrinkage" and "circumferential direction" refer to the direction normal to "longitudinal direction" or normal to "machine direction". The dimensional change is determined immediately after soaking the rectangularly cut film sample in water, and in the process the longitudinal edges and the transverse edges of the film sample must correspond exactly to the longitudinal and transverse directions of the film. For measuring, the film sample is appropriately laid flat on a glass plate. The wet elongation and the wet shrinkage then correspond t the percentage of dimensional change, relative to the length and width prior to soaking in water (water content of 6% to 15% by weight, relative to the total weight).

The water content is measured according to Karl Fischer or by means of a conductivity measuring instrument (for example, "Aqua Boy"), the tensile strength at break and the elongation at break are measured with the aid of an electronic tensile-test machine according to DIN 53 455. "Tensile strength at break" is to be understood as denoting the resistance of the flat sample to tensile stress at the moment of breaking. It is measured as the tensile force (N), relative to the cross-section ($mm^2$). "Elongation at break" is the percentage of elongation of the flat sample compared to the initial length, under loading at the moment of breaking and is indicated in percent. The flat sample used for measuring the tensile strength at break and the elongation at break has a length of 100 mm, a width of 15 mm and a thickness corresponding to a weight per unit area of 20 to 50 $g/m^2$.

EXAMPLE

A 40 mm wide adhesive tape was applied to each of the two edge zones of a 600 mm wide non-reinforced film of regenerated cellulose, which had been prepared according to the viscose process and the characteristic data of which are indicated in Table 1 (base material). The film was then conveyed over a fountainbar coater and moistened on one side over a width of 520 mm. The reinforced edge zones of the film, which had remained dry, were attached to a needle chain and thereafter the reverse side of the film was moistened with the aid of a gravure coater, again leaving the edge zones unmoistened. The film was transversely stretched 25% while being continuously moved forward and then dried under mild conditions to a moisture content of about 9% by weight, while maintaining this transverse stretching. After the film had been removed from the needle chain, the unstretched edge zones were cut away and the film was wound up for further processing.

Table 1 shows the changes in film properties due to transverse stretching.

TABLE 1

|  | Base Material | Material after Transverse Stretching |
|---|---|---|
| weight per unit area ($g/m^2$) | 41.3 | 33.9 |
| water content (%) | 8.7 | 8.8 |
| plasticizer content (%) (glycerol) | 18.8 | 17.7 |
| tensile strength at break ($N/mm^2$) (transv. direction) | 79.9 (dry) 45.8 (wet) | 103.1 (dry) 52.3 (wet) |
| tensile strength at break ($N/mm^2$) (long. direction) | 118.4 (dry) 44.1 (wet) | 120.4 (dry) 48.1 (wet) |
| elongation at break (%) (transv. direction) | 78.6 (dry) 126.0 (wet) | 54.0 (dry) 92.2 (wet) |
| elongation at break (%) (long. direction) | 33.2 (dry) 44.3 (wet) | 38.2 (dry) 49.2 (wet) |

TABLE 1-continued

| | Base Material | Material after Transverse Stretching |
|---|---|---|
| swelling value (%) | 144 | 134 |

The samples measured in the wet state had previously been kept in water at about 35° C. for 30 minutes and were completely saturated with water. The dry samples had a moisture content of about 9%. In addition to attaining an increased tensile strength at break in the wet state and a reduced swelling value, the cellulose hydrate film now has a changed swelling behavior.

Table 2 indicates the respective wet swelling value as the percentage of dimensional change after soaking a 10×10 cm film sample in water for 30 minutes. Prior to soaking in water the sample had had a moisture content of about 9%. The negative values given in the table correspond to shrinkage, the positive values to dimensional increase of the material in the longitudinal and transverse directions.

TABLE 2

| | Change in Length (%) | Change in Width (%) | Change in Thickness (%) |
|---|---|---|---|
| base material | ±0 | +3 | +147 |
| transversely stretched 25% according to this example | +1 | −5 | +115 |

The above-described post-stretched film and the appertaining comparison material (base material) were used to produce tubular casings which had a glued seam in the direction of their longitudinal axes and a flat width of 24.5 mm.

The two tubular casing types were shirred and then subjected to a stuffing test by filling them with sausage meat of the vienna sausage type. The water absorption occurring in this filling procedure gave rise to wet shrinkage of the post-stretched material, such that plump and firm sausages were obtained.

The comparison material, on the other hand, produced wrinkled casings due to wet expansion. In addition, the sausages prepared therewith showed non-uniform surfaces when the casings had been peeled off.

What is claimed is:

1. A stretched non-reinforced film of regenerated cellulose having a dry weight per unit area of 20 to 50 g/m², a dry moisture content of 6% to 15%, an elongation in the longitudinal direction of 0.5% to 1.5% upon exposure to water, and a shrinkage in the transverse direction of 3% to 8% upon exposure to water.

2. A film according to claim 1 wherein the shrinkage in the transverse direction is 4% to 7%.

3. A film according to claim 1 having a weight per unit area of 32 to 37 g/m².

4. A film according to claim 1 wherein the elongation at break of the wet film is 85% to 100% in the transverse direction and 46% to 55% in the longitudinal direction.

5. A film according to claim 1 wherein the tensile strength at break of the wet film is 49 to 56 N/mm² in the transverse direction and 45 to 52 N/mm² in the longitudinal direction.

6. A film according to claim 4 wherein the tensile strength at break of the wet film is 49 to 56 N/mm² in the transverse direction and 45 to 52 N/mm² in the longitudinal direction.

7. A process for the production of non-reinforced films of regenerated cellulose, comprising the steps of:
moistening a dried web of non reinforced cellulose hydrate gel;
stretching the moistened web; and
drying the web while maintaining the stretching force until a moisture content of not more than 20% by weight is achieved.

8. A process according to claim 7 wherein the dried web of cellulose hydrate gel is made by:
extruding viscose in the form of a web;
coagulating the viscose web to give a viscose gel;
regenerating the viscose gel into a cellulose hydrate gel; and
drying the cellulose hydrate gel to form a dried web.

9. A process according to claim 7 wherein the dried web is moistened with water or an aqueous solution to a moisture content of at least 80% by weight relative to its total weight.

10. A process according to claim 9 wherein the moistened web is stretched 18% to 35% in the transverse direction.

11. A process according to claim 7 wherein the dried web is moistened with water or an aqueous solution to a moisture content of at least 100% by weight relative to its total weight.

12. A process according to claim 11 wherein the moistened web is stretched 18% to 35% in the transverse direction.

13. A process according to claim 7 wherein the moistened web is allowed to shrink slightly during drying.

14. A process according to claim 7 wherein the edge zones of the dried web are not moistened.

15. A process according to claim 14 wherein the edge zones are covered prior to moistening by an adhesive tape, a hydrophobic agent or a varnish.

16. A process according to claim 7 wherein the moisture content after drying is 12% by weight.

17. A product produced by the process according to claim 7.

18. A sausage casing made by the process of claim 7.

19. A sausage casing according to claim 17 wherein the dried web is moistened with an aqueous solution which contains agents for improving the peelability of the sausage casing.

* * * * *

UNITED STATES PATENT AND TRADEMARK OFFICE
CERTIFICATE OF CORRECTION

PATENT NO. : 4,784,186
DATED : November 15, 1988
INVENTOR(S) : Karl STENGER, et al.

It is certified that error appears in the above-identified patent and that said Letters Patent is hereby corrected as shown below:

Claim 19, line 1, delete "17" and insert --18--.

Signed and Sealed this

Nineteenth Day of September, 1989

Attest:

DONALD J. QUIGG

Attesting Officer

Commissioner of Patents and Trademarks